(12) United States Patent
Pages-Xatart (10) Patent No.: US 12,226,992 B2
(45) Date of Patent: Feb. 18, 2025

(54) MULTILAYER MULTI-WIDTH STRIP FOR WINDING WITH PROGRESSIVE CHANGE IN THE DEPOSITION ANGLE

(71) Applicant: ARIANEGROUP SAS, Les Mureaux (FR)

(72) Inventor: Guillaume Pages-Xatart, Le Haillan (FR)

(73) Assignee: ARIANEGROUP SAS, Les Mureaux (FR)

(*) Notice: Subject to any disclaimer, the term of this patent is extended or adjusted under 35 U.S.C. 154(b) by 2 days.

(21) Appl. No.: 17/668,995

(22) Filed: Feb. 10, 2022

(65) Prior Publication Data
US 2022/0250348 A1 Aug. 11, 2022

(30) Foreign Application Priority Data
Feb. 11, 2021 (FR) .................................... 2101310

(51) Int. Cl.
| | |
|---|---|
| *B32B 5/12* | (2006.01) |
| *B29B 11/16* | (2006.01) |
| *B29L 31/30* | (2006.01) |
| *B32B 3/02* | (2006.01) |
| *B32B 5/26* | (2006.01) |
| *B32B 37/06* | (2006.01) |

(52) U.S. Cl.
CPC .................. *B32B 5/12* (2013.01); *B32B 3/02* (2013.01); *B32B 5/26* (2013.01); *B32B 37/065* (2013.01); *B29B 11/16* (2013.01); *B29L 2031/3076* (2013.01); *B32B 2260/023* (2013.01); *B32B 2260/046* (2013.01)

(58) Field of Classification Search
CPC .... B32B 5/12; B32B 3/02; B32B 5/26; B32B 37/065; B32B 2260/023; B32B 2260/046; B29B 11/16; B29L 2031/3076
See application file for complete search history.

(56) References Cited

U.S. PATENT DOCUMENTS

| | | |
|---|---|---|
| 6,195,984 B1 | 3/2001 | Cornelius et al. |
| 2004/0081783 A1 | 4/2004 | Prince |
| 2019/0160760 A1 | 5/2019 | Pages-Xatart et al. |
| 2019/0276616 A1 | 9/2019 | Kia et al. |
| 2019/0375190 A1* | 12/2019 | Duval ................... B29C 70/304 |

FOREIGN PATENT DOCUMENTS

| | | |
|---|---|---|
| EP | 3 418 046 A1 | 12/2018 |
| WO | WO 2012/010805 A1 | 1/2012 |

OTHER PUBLICATIONS

Search Report as issued in French Patent Application No. 2101310, dated Oct. 6, 2021.

* cited by examiner

*Primary Examiner* — Alicia J Weydemeyer
*Assistant Examiner* — Laura B Figg
(74) *Attorney, Agent, or Firm* — Pillsbury Winthrop Shaw Pittman LLP

(57) ABSTRACT

A multilayer strip intended to be wound on a form, includes pre-impregnated fiber layers superimposed along a stacking direction, each layer extending widthwise along a transverse direction perpendicular to the stacking direction between a first and a second edge, wherein on at least a portion of the multilayer strip the first edges of the pre-impregnated fiber layers are aligned with each other in the stacking direction, and each second edge is recessed relative to the second edge of the underlying layer in the transverse direction.

9 Claims, 7 Drawing Sheets

MULTILAYER MULTI-WIDTH STRIP FOR WINDING WITH PROGRESSIVE CHANGE IN THE DEPOSITION ANGLE

CROSS-REFERENCE TO RELATED APPLICATIONS

This application claims priority to French Patent Application No. 2101310, filed Feb. 11, 2021, the entire content of which is incorporated herein by reference in its entirety.

FIELD

The present invention relates to the general field of methods for manufacturing parts of composite material implementing in particular the winding of strips of pre-impregnated fabrics with a change in the deposition angle.

BACKGROUND

Ablative-type thermal protection parts are conventionally used to thermally protect the structures or vehicles into which they are incorporated.

Ablative-type thermal protection parts are generally made by winding pre-impregnated fabrics to form a laminated structure, which will then be hardened and consolidated. Thus, the deposited layers are conventionally applied by winding one or more strips of fabric around a form, for example a mandrel, with a deposition angle which is fixed relative to the axis of revolution of the form. "Deposition angle" designates here the angle formed between the axis of revolution of the form and the applied layer. The laminated structure is then hardened and consolidated.

The lamination angle of the layers relative to the surface of the form directly influences the thermomechanical properties of the structure. "Lamination angle" designates here the angle formed between the surface of the form and the applied layer. It is therefore necessary to control the value of this angle.

Modifying the lamination angle may be necessary in different cases, for example when the form to be wound has changes in the angle relative to its axis of revolution, or when portions of the wound part must withstand stresses in different main directions.

When the form to be wound is entirely cylindrical or conical, that is to say without change of angle relative to its axis of revolution, the lamination angle and the deposition angle are constant, or even coincident in the case of a cylindrical form. Thus, a winding with a fixed deposition angle makes it easy to obtain a laminated structure with a satisfactory lamination angle over the entire length of the form relative to a given stress.

On the other hand, when the form has a geometry that has changes of angle relative to its axis of revolution, a winding with a fixed deposition angle will cause variations in the value of the lamination angle. As a result, the lamination angle cannot be satisfactory over the entire length of the form relative to a given stress. Thus, to obtain a satisfactory lamination angle over the entire length of the form, the deposition angle must be modified.

To proceed with the modification of the deposition angle, a first method consists in manufacturing the different portions of the final structure separately, each portion corresponding to a simple conical or cylindrical form. Each portion is thus wound with a fixed deposition angle, but which corresponds to a satisfactory lamination angle for this portion. The different portions are then hardened and their ends are machined so as to allow the assembly of the final structure. This method is long and expensive to implement. Furthermore, this method is not always applicable, in particular when the final form to be wound cannot be cut into portions.

In order to be able to wind directly on the final form, the method described by document U.S. Pat. No. 6,195,984 proposes to perform a winding with a first fixed deposition angle on a portion of the form, associated with a first lamination angle which is satisfactory relative to the expected stresses. The laminated structure thus obtained is then hardened, then machined according to a second satisfactory lamination angle, associated with the next portion of the form. A second winding with a second fixed deposition angle is then made on the next portion of the form, associated with the second satisfactory lamination angle, from the machined surface.

However, this method remains expensive and difficult to implement, in particular because of the machining operation. Furthermore, the abrupt change in the deposition angle within the final structure thus obtained can cause problematic thermomechanical behavior at the interface.

In order to solve these problems, the document US2004081783 proposes to gradually vary the deposition angle along the form. The change in deposition angle is achieved by the use of one or more strips of pre-impregnated fabric with a width less than those of the other used strips of fabric.

The method therefore comprises a first step of conventional winding, according to a first fixed deposition angle, on a portion of the form associated with a first satisfactory lamination angle. One or more strips of fabric having a smaller width are then wound by relying on the previous winding, that is to say always according to the first deposition angle.

The structure formed by these narrower strips of fabric is similar to an angle $\theta$ ramp structure, in other words in the shape of stairs with a slope $\theta$.

A new winding is then performed, using strips of fabric of conventional width, based on the ramp structure previously created. Thus, this new winding will be according to a new fixed deposition angle, corresponding to the value of the first deposition angle subtracted from the value of the angle $\theta$ of the ramp introduced.

Thus, by repeatedly introducing these ramp structures during the winding of the form, it is possible to make a gradual change in the deposition angle. This method therefore allows to obtain a satisfactory lamination angle at any point of the form relative to a future predetermined stress, and thus a very satisfactory lamination from a thermomechanical point of view.

On the other hand, the successive application of strips of different widths remains a rather long operation, with poor repeatability and difficulties for automated production. Furthermore, if the change in the deposition angle remains more gradual than in the previous methods, an even more gradual variation in the lamination angle would be desirable.

SUMMARY

An aspect of the present invention is to overcome the aforementioned drawbacks and to propose a solution which allows to achieve a gradual variation in the deposition angle, for parts made of composite material produced by winding. To this end, the invention proposes, according to a first aspect, a multilayer strip intended to be wound on a form, comprising pre-impregnated fiber layers superimposed along a stacking direction, each layer extending widthwise along a transverse direction perpendicular to the stacking direction between a first and a second edge, wherein at least a portion of the multilayer strip the first edges of the pre-impregnated fiber layers are aligned with each other in the stacking direction, and each second edge is recessed relative to the second edge of the underlying layer in the transverse direction.

Thus, thanks to the production of a multilayer multi-width strip, sudden changes in the deposition angle are avoided and difficult machining operations are avoided. Thanks to the multilayer strip, the application of ramp structures is done by winding a single strip. Thus, the operation of changing the deposition angle is faster to perform and can easily be automated.

According to a particular characteristic of the invention, each fiber layer comprises a plurality of segments, aligned with each other in a longitudinal direction perpendicular to the transverse direction, the facing transverse edges being covered by a segment of an adjacent layer.

According to another particular characteristic of the invention, the upper ridges of the second edges of the superimposed fiber layers are comprised in the same plane. According to another particular characteristic of the invention, the multilayer strip comprises at least one layer comprising a first portion in which the second edge of the layer is recessed by a first distance relative to the second edge of the underlying layer, and a second portion in which the second edge of the layer is recessed by a second distance relative to the second edge of the underlying layer, the first recess distance being greater than the second recess distance.

According to another particular characteristic of the invention, the multilayer strip comprises at least one layer comprising at least one segment the second edge of which has a recess distance different from that of the second edge of another segment of the layer relative to the second edge of the underlying layer.

Thus, the same multilayer strip may comprise at least two ramps of different angles, which allows a very gradual variation of the deposition angle, and thus a structure with better thermomechanical properties.

Another aspect of the invention also relates to a method for manufacturing the multilayer strip, comprising:
  forming a stack of pre-impregnated fiber layers along a stacking direction, each layer extending widthwise along a transverse direction perpendicular to the stacking direction between a first and a second edge, the first edges of the layers being aligned with each other in the stacking direction, each second edge being recessed relative to the second edge of the underlying layer in the transverse direction,
  heating the stack to a temperature at least equal to the softening temperature of at least one resin present therein,
  compacting the heated stack so as to make the layers adhere to each other.

In yet another aspect of the invention also relates to a method for manufacturing a fiber preform of a composite material part, comprising the winding of the multilayer strip.

Another aspect of the invention also relates to a method for manufacturing a composite material part comprising the manufacture of the fiber preform, and the heat treatment of at least one resin present in the preform so as to obtain the composite material part.

According to a particular characteristic of the method for manufacturing the composite material part of the invention, the part is a rocket engine part, for example a nozzle or a space vehicle structure.

DETAILED DESCRIPTION

Figure 1:
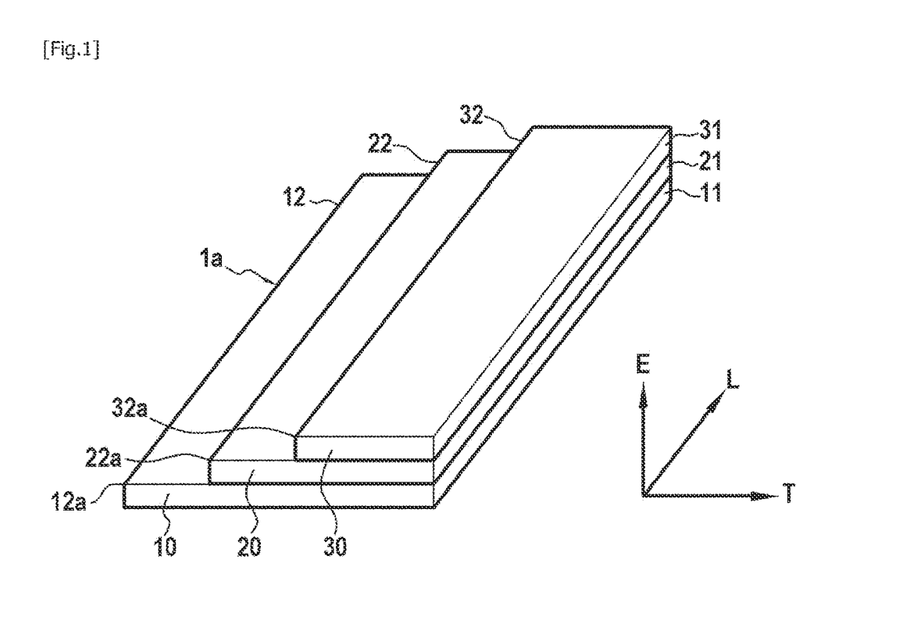
FIG. 1 is a schematic and partial perspective view of a multilayer multi-width strip comprising three superimposed layers, in accordance with one embodiment of the invention.
Figure 2:
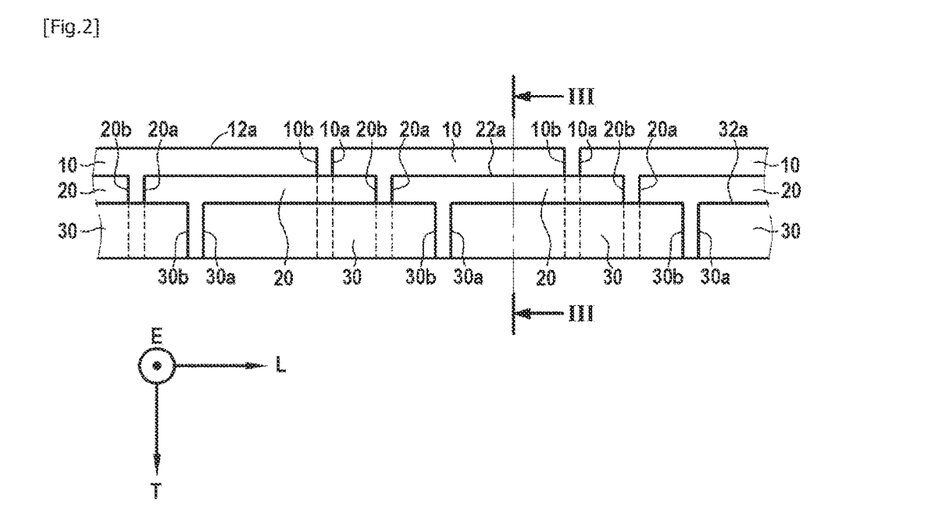
FIG. 2 is a schematic and partial view showing the segmentation of a multi-width multilayer strip comprising three superimposed layers, in accordance with one embodiment of the invention.
Figure 3:
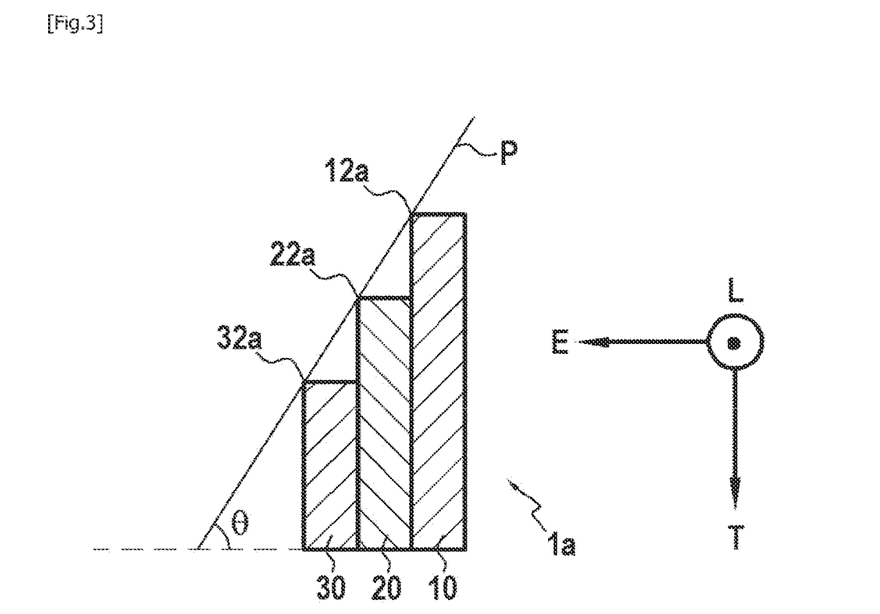
FIG. 3 is a schematic cross-sectional view of the strip of FIG. 2 taken transversely to the longitudinal direction of the strip.

FIGS. 1-3 show a multilayer strip comprising three layers superimposed along a stacking direction E, according to one embodiment of the invention. As will be detailed below, this strip can be used to manufacture a part made of composite material.

The multilayer strip 1a extends in a longitudinal direction L and the direction T materializes the direction along the width of the strip 1a. The strip 1a comprises a first layer 10, extending widthwise between a first edge 11 and a second edge 12, the second edge 12 having an upper ridge 12a. The strip 1a also comprises a second layer 20, extending widthwise between a first edge 21 and a second edge 22, the width of which is smaller than the width of the layer 10, the second edge 22 having an upper ridge 22a. Thus, the distance between the edges 21 and 22 is less than the distance between the edges 11 and 12. The second layer 20 is superimposed on the first layer 10 so that the edges 11 and 21 are aligned in the stacking direction. The strip 1a comprises a third layer 30, extending widthwise between a first edge 31 and a second edge 32, the width of which is smaller than the width of the layer 20, the second edge 32 having an upper ridge 32a. Thus, the distance between the edges and 32 is less than the distance between the edges 21 and 22. The third layer 30 is superimposed on the second layer 20 so that the edges 21 and 31 are aligned in the stacking direction.

It will be noted that the longitudinal edges 11, 12, 21, 22, 31 and 32 may not be straight, but may for example form a broken line or a curve. Thus, the value of the recess distance of the second edge of a layer relative to the second edge of the underlying layer may vary in the longitudinal direction (not shown in FIGS. 1 and 2). It will be noted that the transverse edges, that is to say along the direction T, may not be straight, but may for example form a broken line or a curve.

In this example, the layers 10, 20 and 30 are two-dimensional fabrics pre-impregnated with resin. The layers may also have been produced by three-dimensional weaving, provided that the final thickness of the multilayer strip 1a allows winding. Finally, the fiber structures may also have been made from layers or unidirectional layers of fibers (UD).

The fibers of the layers 10, 20 and 30 can be made of carbon C, Kevlar or ceramics, for example silica, glass, silicon carbide SiC. The layers 10, 20 and 30 can be impregnated with a crosslinkable resin, for example an epoxy resin, or a carbon or ceramic precursor resin, for example silicon carbide (SiC). The layers 10, 20 and 30 can also be pre-impregnated with a phenolic resin. Each layer can be impregnated with a different resin.

The multilayer strip 1a comes in one piece. In particular, there is continuity and cohesion of material between layers 10, 20 and 30, and in particular continuity of the matrix precursor resin(s) therebetween.

FIG. 2 illustrates in particular the continuity of material of the strip 1a along the longitudinal direction L.

Each layer is divided into segments which are repeated along the longitudinal direction L. The segments of the first layer 10 extend in the longitudinal direction between a first transverse edge 10a and a second transverse edge 10b. Similarly, the segments of the second layer 20 extend in the longitudinal direction between a first transverse edge 20a and a second transverse edge 20b, and the segments of the third layer 30 extend in the longitudinal direction between a first transverse edge 30a and a second transverse edge 30b. A segment of the third layer 30 covers at least two consecutive segments of the second layer 20, covering at least the transverse edge 20a of one segment of the layer 20 and the transverse edge 20b of another segment of the layer 20. A segment of the second layer 20 covers at least two consecutive segments of the first layer 10, covering at least the transverse edge 10a of one segment of the layer 10 and the transverse edge 10b of another segment of the layer 10.

It can be ensured that the transverse edges 10a and 10b, 20a and 20b, 30a and 30b, of the consecutive segments are close enough to ensure the cohesion of the strip 1a, without necessarily touching each other. It is ensured, however, that the transverse edges 10b and 10a, 20b and 20a, 30b and 30a of consecutive segments do not overlap.

It will be noted that the longitudinal edges 11, 12, 21, 22, 31 and 32 and the transverse edges 10a, 10b, 20a, 20b, 30a and 30b may not be straight, but may for example form a broken line or a curve.

FIG. 3 shows a section of the multilayer strip 1a, and allows to represent the ramp shape of the multilayer strip 1a, which has an angle θ. According to a particular embodiment of the invention, the upper ridges 12a, 22a and 32a of each of the layers 10, 20 and 30 of the strip are included in the same plane P.

Figure 4:
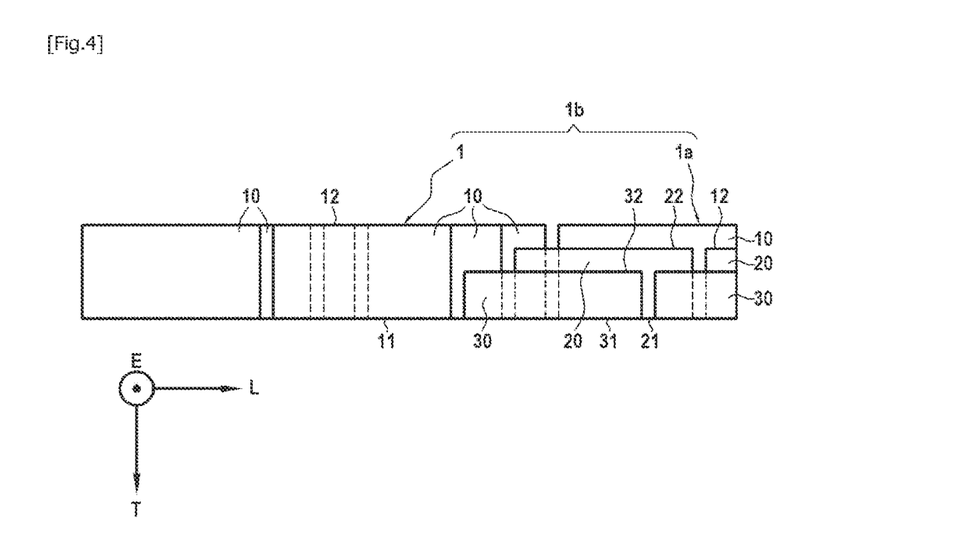
FIG. 4 is a schematic and partial view showing the segmentation of a partly multi-width multilayer strip comprising three superimposed layers, in accordance with another embodiment of the invention.

According to a particular embodiment of the invention, the multilayer strip 1a previously described can be a portion of a longer strip. Thus, FIG. 4 shows a portion of a multilayer strip 1b, including over a first portion of its length a multilayer strip 1, which is a multilayer strip comprising three layers 10 of identical dimension in the transverse direction T, that is to say of identical nominal width, and over a second portion of its length a multilayer strip 1a as described above with three layers of variable widths 10, 20 and 30.

Over the first portion of the length of the multilayer strip 1b, the strip consists of the multilayer strip 1, which comprises three layers 10 which extend widthwise between a first edge 11 and a second edge 12. The first edges 11 are aligned in the stacking direction, and the first edges 12 are aligned in the stacking direction. Each layer is divided into segments which are repeated along the longitudinal direction L. A segment of the second or third layer covers at least two consecutive segments of the underlying layer.

In order to make the transition between the multilayer strip 1 and the multilayer strip 1a, the first segment of the first layer 10 of the multilayer strip 1a is placed consecutively in the longitudinal direction L to the last segment of the first layer 10 of the multilayer strip 1. The first segment of the second layer 20 of the multilayer strip 1a is placed consecutively in the longitudinal direction L to the last segment of the second layer 10 of the multilayer strip 1, so as to cover the last segment of the first layer 10 of the strip 1 and the first segment of the first layer 10 of the strip 1a. The first segment of the third layer 30 of the multilayer strip 1a is placed consecutively in the longitudinal direction L to the last segment of the third layer 10 of the multilayer strip 1, so as to cover the last segment of the second layer 10 of the strip 1 and the first segment of the second layer 20 of the strip 1a. In FIG. 4, "first segment" refers to the leftmost segment, and "last segment" refers to the rightmost segment. It can be ensured that each last segment of the strip 1 is sufficiently close to the first consecutive segment of the strip 1a to ensure the cohesion of the strip 1b, without necessarily touching it. It wig be ensured, however, that consecutive segments do not overlap.

It will be noted that in the case where the consecutive segments of a layer touch each other, at least two consecutive segments may have been made in one piece, that is to say that they are integral even without being covered by the segments of adjacent layers, including if they are of different widths.

The multilayer strip 1b comes in one piece. In particular, there is continuity and cohesion of material between the multilayer strip 1 and the multilayer strip 1a, and between the layers 10, 20 and 30, and in particular continuity of the matrix precursor resin(s) therebetween.

FIGS. 5-8 show a multilayer strip according to another embodiment of the invention, which allows a more gradual variation of the angle of the ramp formed by the multilayer strip during winding. Thus, if it is wished to obtain a ramp with an angle $\theta_2$, it is possible to go through an intermediate ramp with an angle $\theta_1$ less than $\theta_2$.

The multilayer strip 1c extends in a longitudinal direction L and the direction T materializes the direction along the width of the strip 1c. The multilayer strip 1c comprises at least three superimposed layers, each extending widthwise between a first edge and a second edge, the first edges of al the layers being aligned in the stacking direction.

The multilayer strip 1c comprises at least a first, a second and a third consecutive portions in the length of the strip 1c. Thus, each of the portions comprises three stacked layers. Each portion comprises a first layer consisting of one or more segments 110, the second edges 112 of which including an upper ridge 112a.

Figure 5:
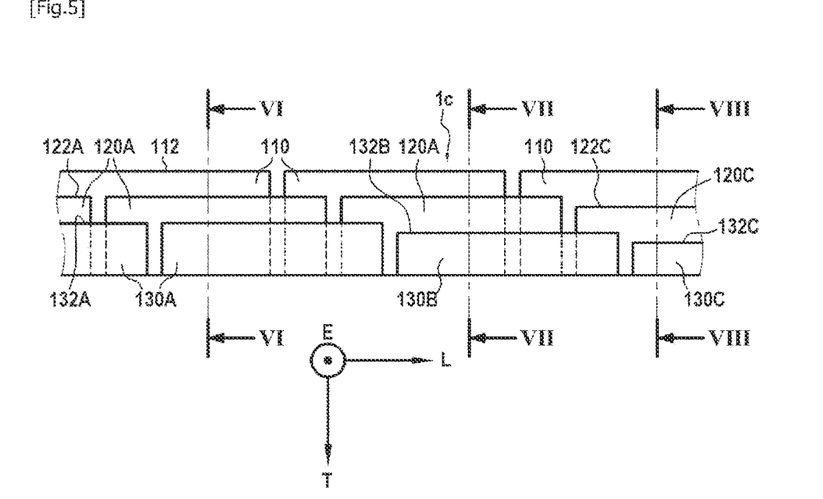
FIG. 5 is a schematic and partial view showing the segmentation of a multi-width multilayer strip comprising three superimposed layers with a variation of the angle of the ramp, in accordance with another embodiment of the invention.
Figure 6:
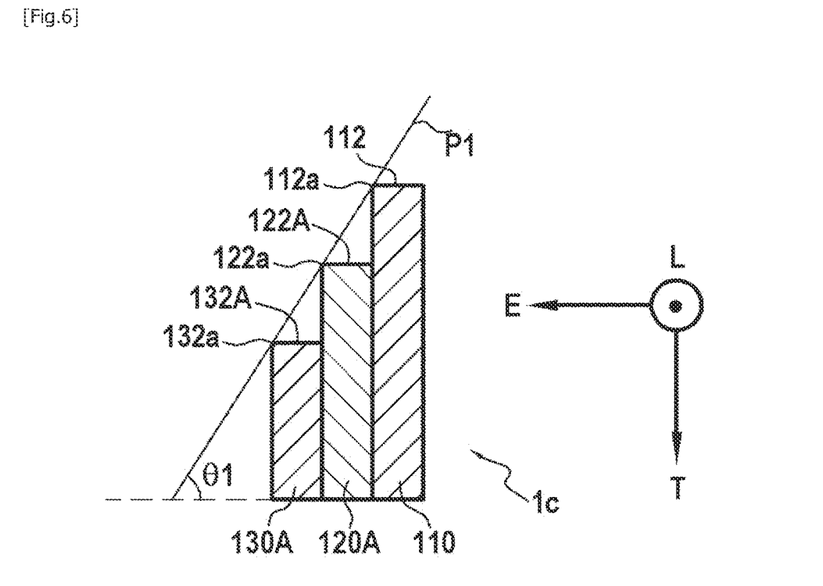
FIG. 6 is a schematic cross-sectional view of the strip of FIG. 5 taken transversely to the longitudinal direction of the strip along the section plane VI.

The first portion of the strip 1c comprises a second layer consisting of one or more segments 120A, of width less than that of the segments 110 of the first layer, and the second edges 122A of which include an upper ridge 122a. The first portion of the strip 1c also comprises a third layer consisting of one or more segments 130A, of width less than that of the segments 110 of the first layer and of the segments 120A of the second layer, and the second edges 132A of which include an upper ridge 132a. The width of the segments 120A and 130A is selected so that the ridges 112a, 122a and 132a are comprised in the same first plane $P_1$ which forms an angle $\theta_1$ with the stacking direction. This angle $\theta_1$ is the angle of the ramp formed by the first portion of the multilayer strip 1c during winding.

Figure 7:
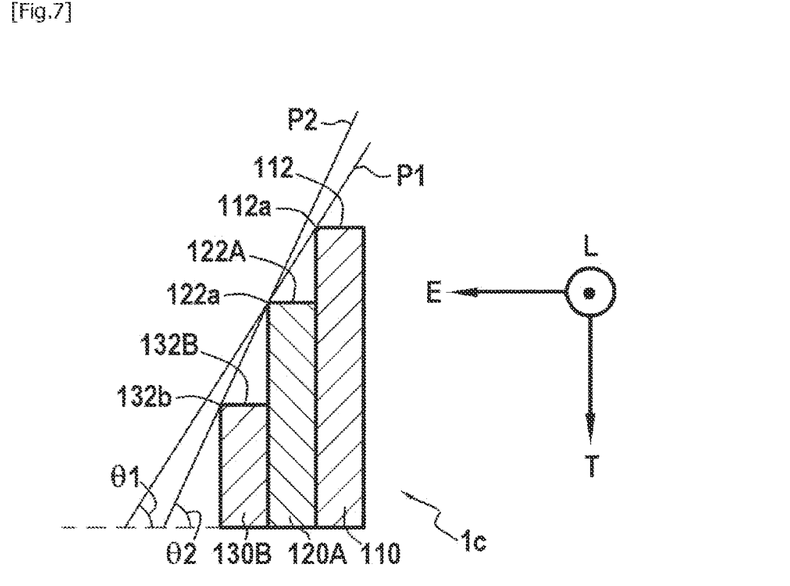
FIG. 7 is a schematic cross-sectional view of the strip of FIG. 5 taken transversely to the longitudinal direction of the strip along the section plane VII.

The second portion of the strip 1c comprises a second layer consisting of one or more segments 120A, identical to those present in the second layer of the first portion of the strip 1c, and the second edges 122A of which include an upper ridge 122a. The first portion of the strip 1c also comprises a third layer consisting of one or more segments 130B, of width less than that of the segments 130A of the third layer of the first portion of the strip 1c, and the second edges 132B of which include an upper ridge 132b. The width of the segment(s) 130B is selected so that the ridges 122a and 132b are comprised in the same second plane $P_2$, which forms an angle $\theta_2$ with the stacking direction. This angle $\theta_2$ is the desired final angle for the ramp formed by the multilayer strip 1c during winding. The ridges 112a and 122a are always comprised in the first plane $P_1$, which forms an angle $\theta_1$ with the stacking direction.

Figure 8:
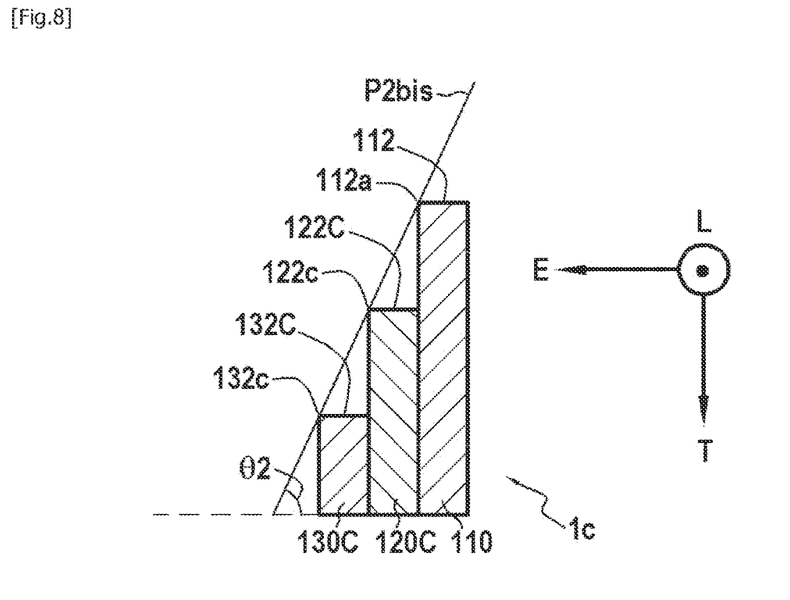
FIG. 8 is a schematic cross-sectional view of the strip of FIG. 5 taken transversely to the longitudinal direction of the strip along the section plane VIII.

The third portion of the strip 1c comprises a second layer consisting of one or more segments 120C, of width less than that of the segments 120A of the second layer of the second portion of the strip 1c, and the second edges 122C of which include an upper ridge 122c. The first portion of the strip 1c also comprises a third layer consisting of one or more segments 130C, of width less than that of the segments 130B of the third layer of the second portion of the strip 1c, and the second edges 132C of which include an upper ridge 132c. The width of the segments 120C and 130C is selected so that the ridges 112a, 122c and 132c are comprised in a plane $P_2$bis parallel to the second plane $P_2$, which forms an angle $\theta_2$ with the stacking direction. This angle $\theta_2$ is the angle of the ramp formed by the third portion of the multilayer strip 1c during winding.

It can be ensured that the consecutive segments of a layer in the longitudinal direction L are close enough to ensure the cohesion of the strip 1c, without necessarily touching it. It will be ensured, however, that consecutive segments do not overlap.

It will be noted that in the case where the consecutive segments of a layer touch each other, at least two consecutive segments may have been made in one piece, that is to say that they are integral even without being covered by the segments of adjacent layers, including if they are of different widths.

The possible structures and materials for the layers of the multilayer strip 1c are identical to those of the previous descriptions.

Examples of strips with three superimposed layers have been described but, of course, this does not depart from the scope of the invention if the strips comprise more than three superimposed layers, provided that the final thickness of the multilayer strip allows the winding. In the event that more than three layers are superimposed, each additional superimposed layer has a width less than the underlying layer.

In the examples of the strips with three layers 1a and 1b, it is not beyond the scope of the invention if the strips comprise only two superimposed layers.

Figure 9:
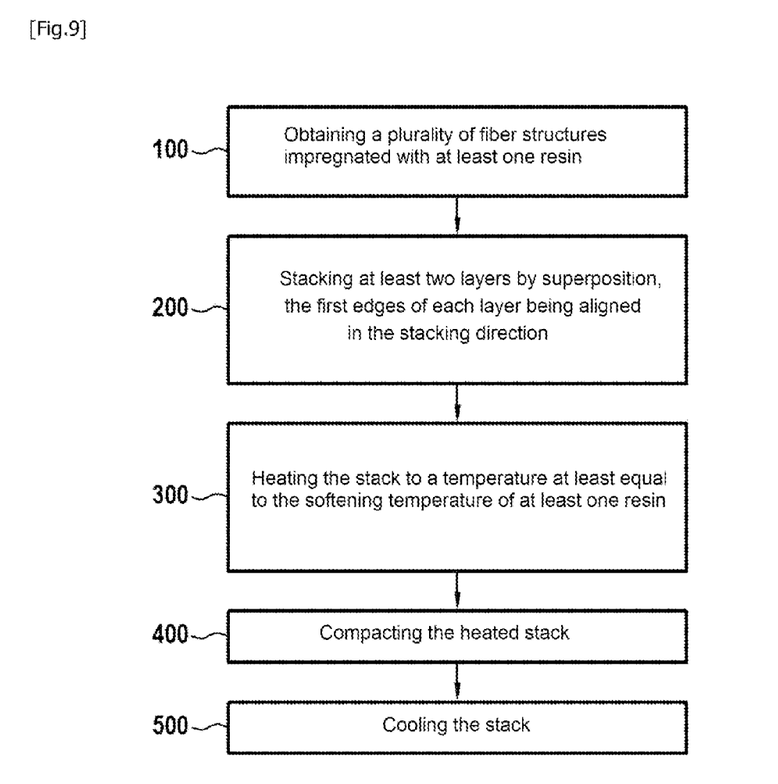
FIG. 9 is a flowchart illustrating the steps of a method for manufacturing a multilayer strip according to one embodiment of the invention.

A method for manufacturing a multilayer strip according to the invention will now be described in connection with the flowchart of FIG. 9.

A first step 100 consists in obtaining a plurality of fiber structures pre-impregnated with at least one resin.

In this example, the fiber structures are two-dimensional tissues. However, it is not beyond the scope of the invention if the fiber structures have a different structure, as explained in the previous embodiments. The possible materials for making these fiber structures are also described in the previous embodiments.

A second step 200 consists of making layers from the fiber structures created previously and stacking them by superposition as described in the previous embodiments. Thus, the stack comprises at least two of the three layers described in FIGS. 1-3.

In a third step 300, the stack produced in step 200 is heated to a temperature at least equal to the softening temperature of at least one resin contained in the stack. Then, in a step 400, the stack thus heated will be compacted to make the stacked layers adhere to each other. The softened resin can thus cause the layers to adhere to each other. It will be noted that the softening temperature is a temperature at which the resin liquefies slightly without polymerizing or crosslinking. The heating and compacting 400 steps can be carried out simultaneously, in a heating press for example.

One possibility for carrying out steps 200, 300 and 400 is to use a device as described in document EP3418046, comprising a conveyor, two loading devices and a heating press, or comprising a step of placing robotic layers.

In step 500, the stack thus heated and compacted is cooled so as to obtain a multilayer strip intended to be wound.

Figure 10:
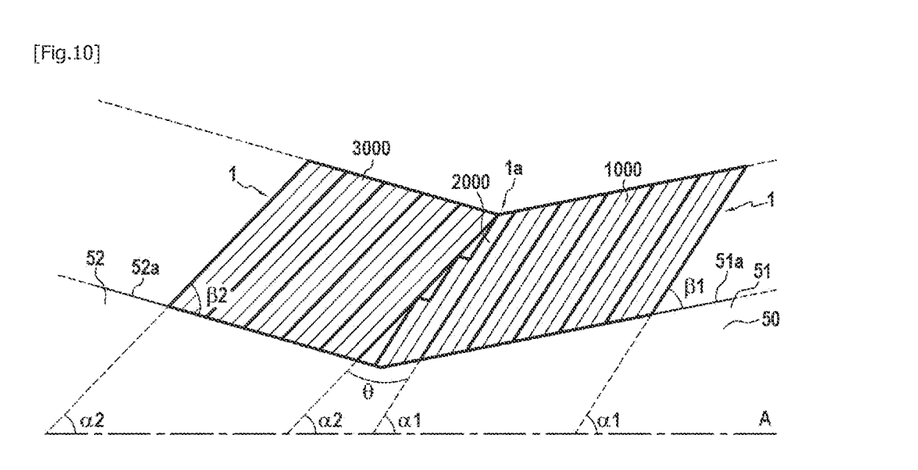
FIG. 10 is a schematic and partial cross-sectional view of a fiber preform obtained after winding a multilayer strip around a form comprising a change of angle within the framework of an example of a method according to the invention, the cutting plane comprising the axis around which the strip(s) have been wound.

FIG. 10 schematically shows a fiber preform obtained after winding a multilayer strip on a form having a change of angle within the framework of an example of a method according to the invention.

The multilayer strip 1a, 1b or 1c is implemented by winding around a winding tool 50, of axis of revolution A which is also the winding axis. This winding tool is divided into a first sub-form 51, for which a first lamination angle $\beta_1$ would be satisfactory, and a second sub-form 52, for which a second lamination angle $\beta_2$ would be satisfactory.

A first winding 1000 is firstly carried out. A strip with a nominal width is wound on the surface 51a, according to the first lamination angle $\beta_1$. This strip can be a strip composed of a single layer, or a multilayer strip like that described in the document EP3418046B1. However, this strip retains a fixed nominal width. The strip is then rolled up with a nominal width around the axis of revolution A according to a first fixed deposition angle $\alpha_1$ by moving towards the opposite surface, that is to say towards the left in the drawing, until partly covering the surface 51a of the tool. In the case of non-developable surfaces, the method described in the document US2019160760A1 can be implemented.

A second winding 2000 is then carried out, by winding the multilayer strip of the invention, the upper layer(s) of the multilayer strip having a width less than the nominal width of the previous strip, and forming an angle θ ramp structure. More specifically, the second winding 2000 is based on the first winding 1000, that is to say always according to the first deposition angle $\alpha_1$.

A third winding 3000 is then carried out by taking up a strip with a nominal width, relying on the previously wound multilayer strip. Thus, the third winding will be done according to a second fixed deposition angle $\alpha_2$, corresponding to the value of the first deposition angle $\alpha_1$ subtracted from the value of the angle θ of the multilayer strip introduced, that is to say $\alpha_2=\alpha_1-\theta$. The third winding will thus take place according to the second lamination angle $\beta_2$.

A preform is thus obtained in several winding steps. It is not beyond the scope of the invention if the winding 2000 of the multilayer strip is made during the same winding as the first or second winding of the strip of nominal width, for example by using a multilayer strip 1b, described above. It is also possible to carry out the three winding steps 1000, 2000 and 3000 during the same winding, using a multilayer strip adapted on the model of the multilayer strip 1b.

It is also within the scope of the invention if the strips used for the windings 1000 and 3000 have different nominal widths, for example to optimize the thickness of the part.

The part can then be obtained by heat treatment of the preform obtained, for example in order to polymerize or crosslink the resin(s) present.

Figure 11:
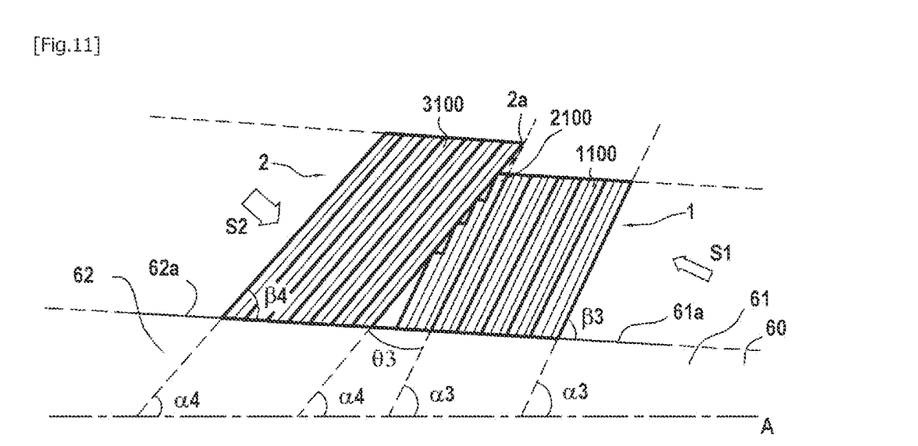
FIG. 11 is a schematic and partial cross-sectional view of a fiber preform obtained after winding a multilayer strip around a form not comprising a change of angle within the framework of an example of a method according to the invention, the cutting plane comprising the axis around which the strip(s) have been wound.

FIG. 11 schematically shows a fiber preform obtained after winding a multilayer strip in the context of an example of a method according to the invention. In this example, the part obtained by heat treatment of the fiber preform is intended to undergo a first stress in a first portion of the length of the part, and a second different stress in a second portion of the length of the part.

A multilayer strip according to the invention is implemented by winding around a winding tool 60, of axis of revolution A which is also the winding axis.

The first stress S1 will be applied to a first portion 61 of the length of the preform located on the right in the drawing, opposite which the angle $\beta_3$ is a satisfactory lamination angle. A second stress S2, directed at a different angle and of greater significance, will apply to a second portion 62 of the length of the preform located on the left in the drawing, and facing which the angle $\beta_2$ is a satisfactory lamination angle.

A first winding 1100 is firstly carried out. A strip 1 with a first nominal width is wound on the surface 51a, according to the first lamination angle $\beta_3$. This strip can be a strip composed of a single layer, or a multilayer strip like that described in the document EP3418046B1. However, this strip retains a fixed nominal width. The strip is then rolled up with the first nominal width around the axis of revolution A according to a first fixed deposition angle $\alpha_3$ by moving towards the opposite surface, that is to say towards the left on the drawing until covering the surface 61a of the tool.

A second winding 2100 is then carried out, by winding the multilayer strip of the invention, the upper layer(s) of the multilayer strip having a width less than the nominal width of the previous strip, and forming an angle $\theta_3$ ramp structure. More specifically, the second winding 2000 is based on the first winding 1100, that is to say always according to the first deposition angle $\alpha_3$. In the example presented here, the multilayer strip 2a according to the invention comprises four superimposed layers.

A third winding 3100 is then carried out by implementing a strip 2 with a second nominal width, relying on the multilayer strip 2a previously wound. The stress S2 being greater than the stress S1, a greater thickness is necessary. Thus, the second nominal width of the strip 2 is greater than the first nominal width of the strip 1. Thus, the third winding will be done according to a second fixed deposition angle $\alpha_4$, corresponding to the value of the first deposition angle $\alpha_3$ subtracted from the value of the angle $\theta_3$ of the multilayer strip introduced, that is to say $\alpha_4=\alpha_3-\theta_3$. The third winding will thus take place according to the second lamination angle $\beta_4$.

The part can then be obtained by heat treatment of the preform obtained, for example in order to polymerize or crosslink the resin(s) present.

Figure 12:
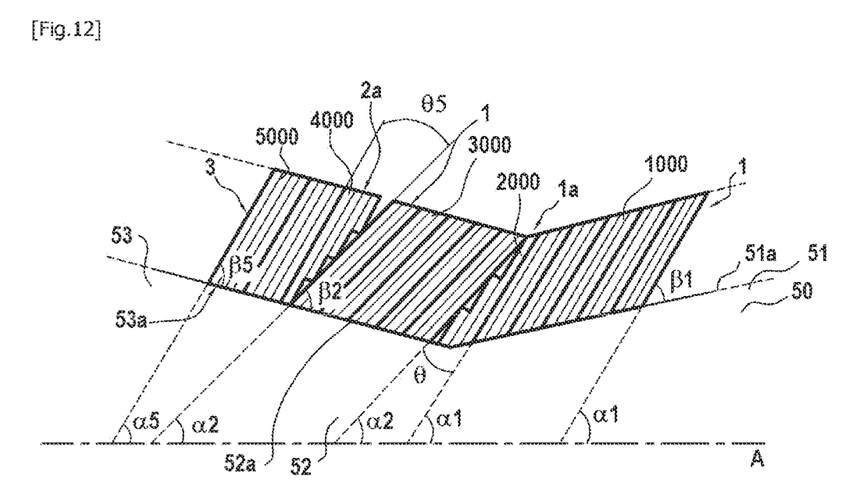
FIG. 12 is a schematic and partial cross-sectional view of a fiber preform comprising two ramps obtained after winding a multilayer strip around a form comprising a change of angle within the framework of an example of a method according to the invention, the cutting plane comprising the axis around which the strip(s) have been wound.

FIG. 12 schematically shows a fiber preform obtained after winding a multilayer strip around a shape comprising a change of angle within the framework of an example of a method according to the invention. In this example, the deposition angle is varied twice during the winding of the preform.

A multilayer strip according to the invention is implemented by winding around a winding tool 50, of axis of revolution A which is also the winding axis.

First, three windings 1000, 2000 and 3000 are carried out as described in the embodiment of FIG. 10. Then it is desired to modify the lamination angle again, for example to adapt to new stresses on the portion 53 of the form 50.

A fourth winding 4000 is thus carried out, by winding the multilayer strip of the invention, the upper layer(s) of the multilayer strip having a width less than the nominal width of the previous strip, and forming an angle $\theta_5$ ramp structure. More precisely, the fourth winding 4000 is based on the third winding 3000, that is to say according to the deposition angle $\alpha_2$. In the example presented here, the multilayer strip 2a according to the invention comprises four superimposed layers.

A fifth winding 5000 is then carried out by implementing a strip 3, relying on the multilayer strip 2a previously wound. The third winding is done according to a fixed deposition angle $\alpha_5$, corresponding to the sum of the value of the deposition angle $\alpha_2$ and the value of the angle $\theta_5$ of the multilayer strip 2a introduced, that is to say $\alpha_5=\alpha_2+\theta_5$. The fifth winding will thus take place according to a lamination angle $\beta_5$.

The part can then be obtained by heat treatment of the preform obtained, for example in order to polymerize or crosslink the resin(s) present.

The invention claimed is:

1. A multilayer strip intended to be wound on a form, comprising pre-impregnated fiber layers superimposed along a stacking direction with continuity of a matrix precursor resin between said pre-impregnated fiber layers such that the multilayer strip pre-impregnated with the matrix precursor resin forms a one-piece element that is woundable on the form, each layer extending widthwise along a transverse direction perpendicular to the stacking direction between a first and a second edge, wherein on at least a portion of said multilayer strip the first edges of the pre-impregnated fiber layers are aligned with each other in the stacking direction, and each second edge is recessed relative to the second edge of the underlying layer in the transverse direction in order to form a ramp, wherein the stacked pre-impregnated fiber layers are compacted such that the stacked pre-impregnated fiber layers adhere to each other and wherein the ramp formed by the second edges enables a gradual variation of an angle of deposition of the strip when the strip is wound on the form.

2. The multilayer strip according to claim 1, wherein each fiber layer comprises a plurality of segments, aligned with each other in a longitudinal direction perpendicular to the transverse direction, the facing transverse edges being covered by a segment of an adjacent layer.

3. A multilayer strip according to claim 1, wherein the second edge of each layer extends between a lower ridge and an upper ridge along the stacking direction, and wherein the upper ridges of the second edges of the superimposed fiber layers are comprised in the same plane.

4. The multilayer strip according to claim 1, comprising at least one layer comprising a first portion in which the second edge of the layer is recessed by a first distance relative to the second edge of the underlying layer, and a second portion in which the second edge of the layer is recessed by a second distance relative to the second edge of the underlying layer, the first recess distance being greater than the second recess distance.

5. The multilayer strip according to claim 2, comprising at least one layer comprising at least one segment the second edge of which has a recess distance different from that of the second edge of another segment of said layer relative to the second edge of the underlying layer.

6. A method for manufacturing a multilayer strip according to claim 1, the method comprising:
   forming a stack of pre-impregnated fiber layers along a stacking direction, each layer extending widthwise along a transverse direction edge, the first edges of the layers being aligned with each other in the stacking direction, each second edge being recessed relative to the second edge of the underlying layer in the transverse direction,
   heating the stack to a temperature at least equal to the softening temperature of at least one resin present therein,
   compacting the heated stack so as to make the layers adhere to each other.

7. The method for manufacturing a fiber preform of a composite material part, comprising winding the multilayer strip according to claim 1.

8. A method for manufacturing a composite material part comprising manufacturing a fiber preform by implementing the method according to claim 7, and heat treating at least one resin present in the preform so as to obtain the composite material part.

9. The method according to claim 8, wherein the part is a rocket engine part, for example a nozzle or a space vehicle structure.

* * * * *